(12) United States Patent
Ashrafzadeh

(10) Patent No.: US 9,367,502 B1
(45) Date of Patent: Jun. 14, 2016

(54) COMMUNICATION METHODS AND APPARATUS AND POWER SUPPLY CONTROLLERS USING THE SAME

(75) Inventor: Ahmad R. Ashrafzadeh, Morgan Hill, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1049 days.

(21) Appl. No.: 13/481,313

(22) Filed: May 25, 2012

Related U.S. Application Data

(60) Provisional application No. 61/496,962, filed on Jun. 14, 2011.

(51) Int. Cl.
G06F 13/42 (2006.01)
H04B 1/38 (2015.01)
H04L 5/16 (2006.01)
B23K 11/24 (2006.01)
H02B 1/24 (2006.01)
G06F 13/38 (2006.01)
H04B 1/40 (2015.01)

(52) U.S. Cl.
CPC ............... *G06F 13/385* (2013.01); *H04B 1/40* (2013.01)

(58) Field of Classification Search
USPC ............................ 710/106; 375/220; 307/112
See application file for complete search history.

(56) References Cited

U.S. PATENT DOCUMENTS

| 4,477,896 A * | 10/1984 | Aker .............................. 370/201 |
| RE33,663 E * | 8/1991 | Kade et al. ...................... 701/78 |
| 6,289,205 B1 * | 9/2001 | Pollanen et al. ............... 455/126 |
| 6,856,922 B1 * | 2/2005 | Austin et al. .................... 702/63 |
| 2007/0280720 A1 * | 12/2007 | Kimura ............................ 399/88 |
| 2008/0177917 A1 * | 7/2008 | Cagno et al. ................... 710/110 |
| 2011/0121858 A1 * | 5/2011 | Cassagnes et al. .............. 326/59 |
| 2012/0072738 A1 * | 3/2012 | Bushue et al. ................. 713/300 |

OTHER PUBLICATIONS

"What is a Pulse Width Modulation (PWM) Signal and What is it Used for?", Oct. 7, 2003, National Instruments, retrieved from the Internet on Nov. 19, 2015 at <http://digital.ni.com/public.nsf/allkb/294E676237526566862S6DB800508989>.*
"Amplitude Modulation", Nov. 4, 2014, National Instruments, retrieved from the Internet on Nov. 19, 2015 at <http://www.ni.com/white-paper/3002/en/>.*
Maxim Integrated Products, Inc., "MAX15112 High-Efficiency, 12A, Current-Mode Synchronous Step-Down Regulator with Integrated Switches" (Sep. 2011) pp. 1-23.
Maxim Integrated Products, Inc., "MAX8688 Digital Power-Supply Controller/Monitor with PMBus Interface" (Feb. 2011) pp. 1-38.

* cited by examiner

*Primary Examiner* — Faisal M Zaman
(74) *Attorney, Agent, or Firm* — Blakely Sokoloff Taylor & Zafman LLP

(57) ABSTRACT

Communication methods and apparatus and power supply controllers using the same. The method includes transferring information over a line from a first location to a second location as a voltage signal while simultaneously transferring information over the same line from the second location to the first location as a current signal. Further, digital information may be transmitted over the same line. When applied to a power supply controller system, a master controller may control a plurality of slave controllers by initially setting up the slave controllers by transmitting digital information to the slave controllers, and then maintaining a set point for each controller while monitoring controller characteristics over the same lines.

29 Claims, 2 Drawing Sheets

COMMUNICATION METHODS AND APPARATUS AND POWER SUPPLY CONTROLLERS USING THE SAME

CROSS-REFERENCE TO RELATED APPLICATIONS

This application claims the benefit of U.S. Provisional Patent Application No. 61/496,962 filed Jun. 14, 2011.

BACKGROUND OF THE INVENTION

1. Field of the Invention

The present invention relates to the field of communication methods and power supply controllers.

2. Prior Art

Most electronic systems today require multiple power supply rails. In notebook computers, there are about 10 different rails. This number is increased to 25 or more in more complex servers and networking equipment. As the number of rails increase, there is more need for sequencing and tracking of the outputs which makes the entire system complex and requires central control on the board.

Additionally it has become important to have current monitoring capability for most of the rails. In enterprise equipment, this information helps understand the health of the overall unit, and in battery operated systems such in Notebook computers, this information helps make more efficient use of the system. Nonetheless this is a common desire for everyone across the board.

DETAILED DESCRIPTION OF THE PREFERRED EMBODIMENTS

The preferred embodiment of the present invention is used in power supply controllers for systems requiring a plurality of power supply rails. Accordingly such systems will use a single master device and a plurality of slave devices, each slave device being coupled to the master device and being responsive thereto to receive information from the master device and simultaneously provide information to the master device over the same line or lines.

Figure 1:
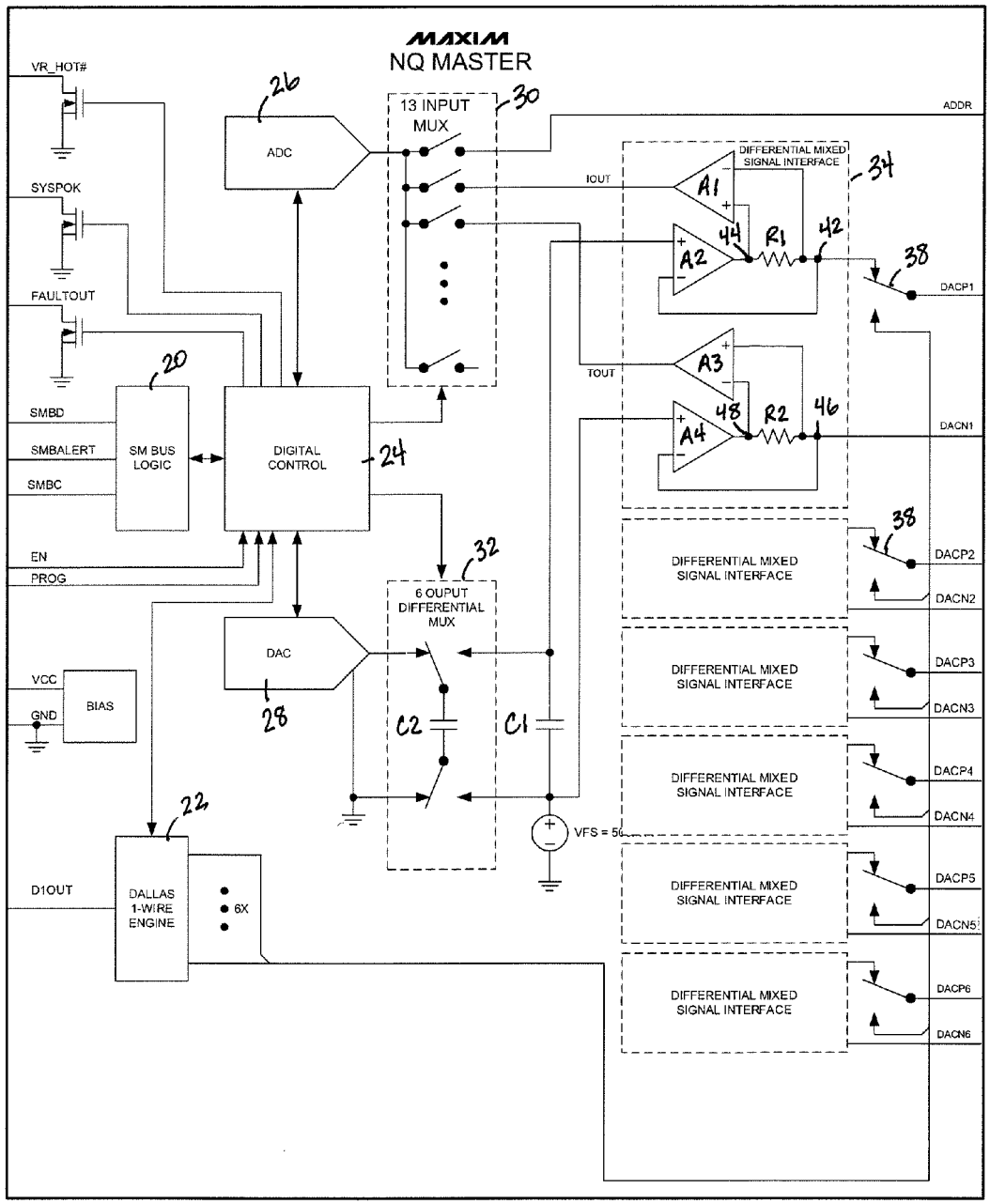
FIG. 1 is a block diagram of an exemplary embodiment of a master device in accordance with the present invention.

Referring first to FIG. 1, a block diagram of a typical master device may be seen. The connections at the left side of this Figure are connections which include connections from and to an overall system controller which may communicate with the master controller of FIG. 1, in this embodiment particularly through the SMBus interface 20. In addition, a Dallas 1-WIRE® engine 22 may provide output information as may be received from the slave units. 1-WIRE® is a proprietary interface developed by Dallas Semiconductor that normally uses a single wire for both data and power. Dallas Semiconductor is now owned by Maxim Integrated Products, Inc., assignee of the present invention, which is also the owner of the 1-WIRE® trademark registration. The SMBus logic interface 20 is coupled to a digital control 24 which in turn is coupled to an analog to digital converter 26 and a digital to analog converter DAC 28, as well as to the controls for 12 input multiplexer 30 and 6 output differential multiplexer 32 and to the Dallas 1-WIRE® engine 22. In one embodiment, the DAC is a 10 bit DAC.

In the embodiment being described, up to six slave units may be connected to the master unit of FIG. 1. Thus there are six differential mixed signal interfaces 34, each having connections to a respective slave device DACPn and DACNn. Thus the first is labeled DACP1 and DACN1, etc. Each differential mixed signal interface includes amplifiers A1 and A2 as well as resistor R1, and amplifiers A3 and A4 as well as resistor R2. These devices provide an important function in the present invention, as is best illustrated by cooperative aspects of each slave device.

Figure 2:
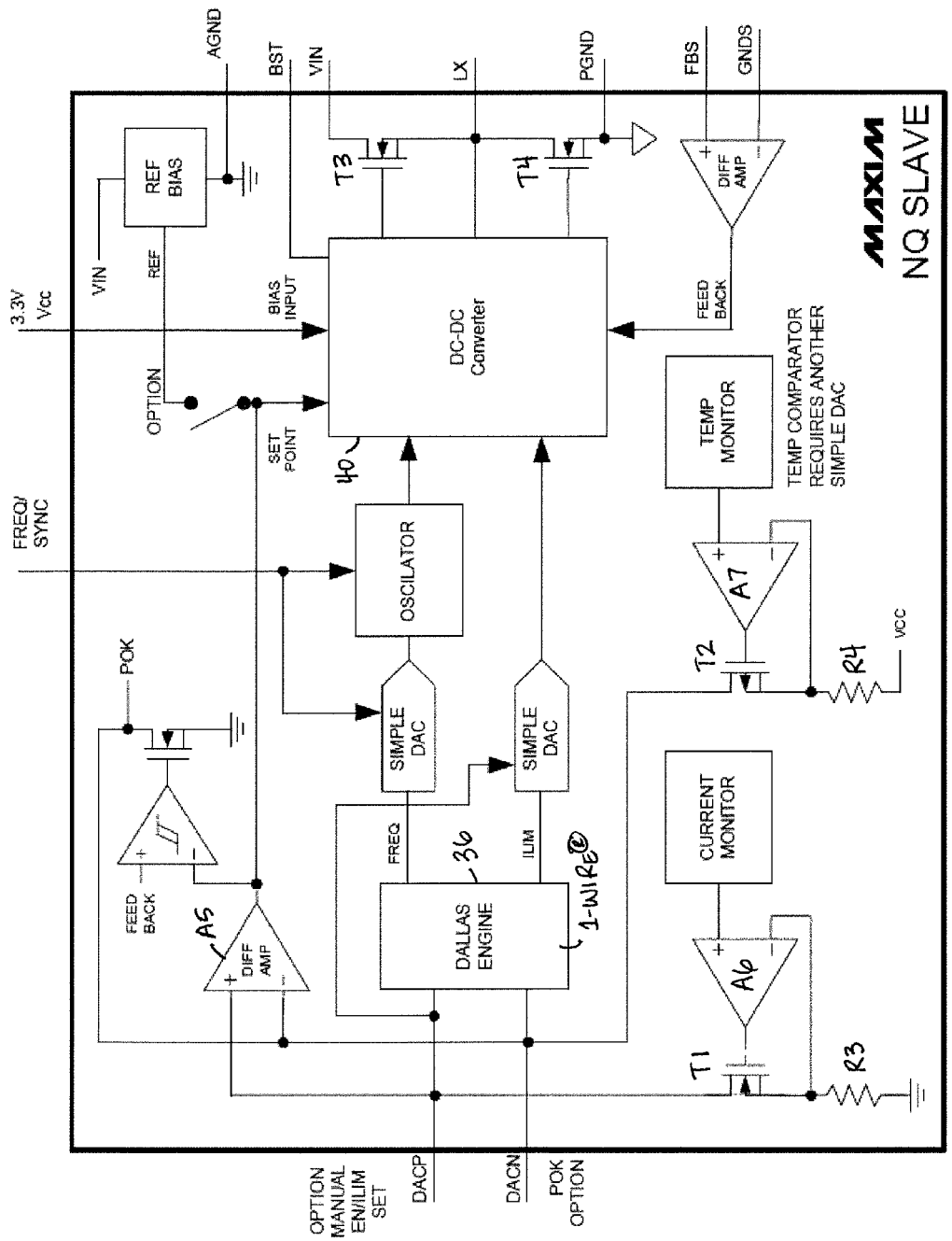
FIG. 2 is a block diagram of an exemplary slave device in accordance with one embodiment of the present invention.

Referring now to FIG. 2, a block diagram of an exemplary slave device may be seen. The slave device has inputs DACP and DACN from a master device such as that shown in FIG. 1 that are coupled to inputs of a slave Dallas engine 36. Also coupled to the connections DACP and DACN are the inputs to amplifier A5 and the drains of transistors T1 and T2. The source of transistor T1 is coupled to ground through resistor R3, with the gate of transistors T1 being controlled by amplifier A6 coupled as a unity gain amplifier responsive to a current monitor. The source of transistor T2 is coupled to VCC through resistor R4, with the gate of transistor T2 being controlled by amplifier A7 coupled as a unity gain amplifier responsive to an output of a temperature monitor. The current monitor may be, by way of example, a sense resistor in series with the power supply or some other appropriate current sense device, such as a fuel gauge. The temperature monitor, on the other hand, may be by way of example a thermistor, though in many systems would be a temperature monitor on the power supply board having a digital output, in which case a simple digital to analog converter would be required to provide the positive input to amplifier A7.

With respect to the current monitor, amplifier A6 controls the gate of transistor T1 so that the voltage across resistor R3 is equal to the voltage on the positive input of amplifier A6, i.e., the voltage output of the current monitor. Consequently, the current through resistor R3 will be equal to $V_{CM}/R3$, where $V_{CM}$ is the output voltage of the current monitor. Similarly, the current through transistor T2 will be equal to VCC minus the output voltage of the temperature monitor divided by R4. The current to the current monitor and the current from the temperature monitor are coupled through the respective connections DACPn and DACNn for each respective slave device.

Referring back to FIG. 1, the Dallas 1-WIRE® engine 22 may provide an output on six lines to communicate with up to six slave devices connected to the master device through the DACP lines, dependent on the position of switch 38 for the respective differential mixed signal interface 34. In particular, when switches 38 are in the lower position, each of the six outputs of the 1-WIRE® engine 22 is coupled to a respective one of the DACP outputs. Thus the 1-WIRE® engine 22 in the master device of FIG. 1 may communicate with the Dallas engine 36 in each of the slaves coupled thereto through the single DACP line connected thereto.

After the digital communication to the slave devices for the initial setup thereof, the digital control 24 will provide digital outputs to the digital to analog converter 28, which ultimately sets the set point (regulated output voltages) of the DC-DC converter 40 of each of the slave devices (FIG. 2). The DC-DC converter controller 40, as well as other components associated with the DC-DC converter such as power transistors T3 and T4 coupled between the power supply and the slave circuit ground, the inductor (not shown) that will be coupled between the output LX and an output capacitor (not shown) and the feedback of the power supply output on the output capacitor (not shown) through the differential amplifier Dif Amp, etc., are well known in the switching regulator art and will not be described in further detail herein. In particular, the output of the digital to analog converter 28 is coupled one at a time through the 6 output differential MUX 32 to the positive inputs of amplifiers A2 and A4 in their respective differential mixed signal interface 34. Capacitor C1 acts as a sample and hold capacitor (one for each differential mixed signal interface), with capacitor C2 acting as a charge transferring capacitor for the 6 output differential MUX 32. As may be seen in the upper differential mixed signal interface 34, amplifier A2 is effectively coupled as a unity gain amplifier in that the output (node 42) to the respective DACP terminal through switch 38 will be equal to the input to the positive terminal of the amplifier. However note that while the input to the Dallas engine 36 in the slave devices (FIG. 2) is a high impedance input, the respective DACP output from resistor R1 in the respective differential mixed signal interface 34 must source the current through resistor R3 (FIG. 2) which is proportional to the output of the current monitor for the power supply controlled by the respective slave. Thus the output of amplifier A2 on node 44 will be higher than the voltage on node 42 by R1/R3 times the output voltage output of the current monitor. The voltage difference between nodes 44 and 42 is sensed by amplifier A1 and will be passed through the 12 input MUX to analog to digital converter ADC 26, and from there to the digital control 24 in digital form. In one embodiment, the ADC is an 8 bit ADC.

Similarly, the current sourced through resistor R4 (FIG. 2) by the temperature monitor through amplifier A7 and transistor T2 will be provided by the slaves through their DACN connection to the master (FIG. 1). Now the voltage on node 48 will be lower than the voltage on node 46 because of the current through resistor R2 from the temperature monitor circuit, which voltage differential is sensed by amplifier A3 and also passed through 12 input MUX 30 to be converted to digital form by the analog to digital converter 26 and also passed to the digital control. Thus at the same time that the set point for each of the power supplies controlled by a respective slave is provided to the respective slave through the respective DACP and DACN lines, these two lines are also providing signals from the respective slave back to the master device in the form of current signals which are ultimately successively digitized and transferred to the digital control as digital signals. These digital signals can be monitored by the digital control and provided through the SMBus logic to the overall system controller (not shown), as an alert to indicate an extraordinary event and/or simply occasionally for monitoring by the overall system controller. Similarly, the digital control 24 can shut down any or all power supplies controlled by slaves coupled to the master, either by driving the set points to zero or alternatively, or in addition, by sending digital commands to the slave devices through the Dallas 1-WIRE® engine 22.

Of course, when switches 38 (FIG. 1) are in the lower position the Dallas 1-WIRE® engine 22 in the master device may talk to the Dallas engine 36 in the slave devices in digital form as a two-way communication, depending on the programming of the system. Thus using merely two lines, a DACP and DACN line for each slave device, the master device and slave devices may talk to each other over these two lines in digital form, and in addition, the master may provide unique set points to each slave device in analog voltage form for controlling the respective power supply and simultaneously therewith receive over the same lines current signals representing the output of a current monitor and a temperature monitor on each power supply board from each slave device. Thus, simultaneous two-way analog signal communication is provided by transferring a voltage signal over the lines in one direction, while at the same time transferring current signals over the same lines in the opposite direction. Thus in the particular embodiment disclosed, a set point for each power supply is transmitted as a voltage signal from the master device to the slave devices, while at the same time the slave devices provide analog current signals back to the master device, representing the output of a current monitor and a temperature monitor for each power supply.

In the foregoing embodiment, the DACP and DACN lines between the master device and each slave device provide a double ended signal to establish the set point at each slave device. However in alternate embodiments a single ended signal may be used so that the only connection between the master unit and each slave unit would be a single DAC line, which would still allow communication in digital form, in both directions if desired, between the master and slave units and would also provide analog communication of the unique set points from the master device to each slave device with simultaneous transmission of another analog signal from the slave device to the master device. Also, although the Dallas 1-Wire® communication system is used in the embodiment disclosed, other embodiments may use other communication systems as desired. By way of example, in the embodiment disclosed wherein there are two wires available, one can use a simple SMBus or some other clocked buss. Even with one wire, one is not limited to the Dallas 1-Wire® communication system or protocol (which uses one wire plus a ground connection). In that regard, one difference in the typical application of the present invention and the Dallas 1-Wire® communication system is that in applications of the present invention, the slaves will generally be powered, allowing use of a wide variety of serial communication techniques and protocols.

Note that the set point is sent to the slave devices as a form of differential analog signal, though as described above, the set point could be sent over a single line as a single ended analog signal. Similarly, the current signals are sent as single ended analog signals on each of two lines separately, and accordingly each current signal is sent over a single line. As further alternatives, analog signals may be time multiplexed on one to two lines, if desired. Further, either or both the voltage and current signals could be sent in digital form, though if digital signals are used for both signals, preferably both are sent at the same synchronized frequency, or the lower frequency signal is sent at a frequency that is a sub-harmonic of the higher frequency and synchronized therewith so that digital transitions of the lower frequency signal always occur on a transition of the higher frequency signal. Actually in the embodiment shown, digital information is sent over the DACN lines for slave setup purposes when the multiplexer 38 is in the opposite state from that shown. Also either or both signals could be modulated on a carrier for transmission, though this is not preferred because of its complexity and noise.

In the Figures, certain differential amplifiers, such as differential amplifiers A2 and A4 are illustrated with their feedback, as the feedback is a functional part of one aspect of the invention. In other cases, differential amplifiers such as differential amplifiers A1 and A3 are shown without feedback, though feedback or other means would obviously be used to provide the desired, controlled gain of such amplifiers. Finally, in the claims to follow, reference is made to the fact that the master and slave devices are at different locations.

Note that the different locations will usually be locations within the same system, or even locations on the same circuit board, and include master and slave devices that may be side by side on a circuit board.

Thus the present invention has a number of aspects, which aspects may be practiced alone or in various combinations or sub-combinations, as desired. While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A method of simultaneous bidirectional communication over a first line between first and second locations comprising:
    transferring information over the first line from the first location to the second location as an analog voltage signal;
    while simultaneously transferring information over the same first line from the second location to the first location as an analog current signal;
    wherein the method is practiced in a power supply controller having a master controller at the first location and a plurality of slave controllers at the second and at least one other location, each having at least one line between the respective slave controller and the master controller; and
    wherein the master controller includes first and second multiplexers, whereby unique voltage signals may be sent by the master controller through the first multiplexer to the slave controllers in succession while receiving current signals from the respective slave controllers through the second multiplexer at the same time.

2. The method of claim 1 further comprising transferring digital information over the first line from the first location to the second location and digital information over the first line from the second location to the first location.

3. The method of claim 1 wherein the analog current signal is provided to the line at the second location by providing a current load or a current source on the line responsive to the current signal.

4. The method of claim 3 wherein a voltage at the second location is converted to the current signal by a differential amplifier having one input coupled to the voltage and a second input coupled to a voltage at one end of a resistor, another end of the resistor being coupled to a fixed voltage, the output of the differential amplifier being coupled for controlling the current through a transistor in series with the resistor.

5. The method of claim 1 wherein the analog voltage signal is coupled to the line at the first location by a first differential amplifier.

6. The method of claim 5 wherein the first differential amplifier is a feedback amplifier having a first end of a resistor coupled to an output of the feedback amplifier and a second end of the resistor coupled to the line and as a feedback to the feedback amplifier, and wherein the analog current signal is recovered at the first location as a voltage across the resistor.

7. The method of claim 6 wherein the voltage across the resistor is sensed by a second differential amplifier.

8. The method of claim 1 wherein the analog voltage signal is recovered at the second location by an amplifier.

9. The method of claim 1 wherein the method is practiced in a power supply controller having a master controller at the first location and a slave controller at the second location.

10. The method of claim 9 wherein the analog voltage signal is a control signal to control an output of a power supply at the second location.

11. The method of claim 10 wherein the analog current signal is indicative of a temperature.

12. The method of claim 10 wherein the analog current signal is indicative of an output of the power supply.

13. The method of claim 10 wherein the analog current signal is indicative of a current output of the power supply.

14. A method of simultaneous bidirectional communication over a pair of lines between first and second locations comprising:
    in a power supply controller having a master controller at the first location and a plurality of slave controllers at the second and other locations, each having at least two lines between the respective slave controller and the master controller;
    transferring information over the two lines from the first location to the second location as a voltage signal;
    while simultaneously transferring information over the same two lines from the second location to the first location as current signals;
    the master controller including first and second multiplexers, whereby unique voltage signals may be sent by the master controller through the first multiplexer to the slave controllers in succession as differential voltage signals while receiving a pair of current signals from the respective slave controllers at the same time and over the same pair of lines through the second multiplexer.

15. The method of claim 14 wherein the differential voltage signals set an output of the respective power supplies.

16. The method of claim 15 wherein the current signals are responsive to an output current and a temperature of a respective power supply.

17. The method of claim 14 wherein one of the voltage signals is coupled to a respective line through a third multiplexer, and wherein digital signals rather than analog signals may be coupled to the respective line through the third multiplexer.

18. The method of claim 17 wherein the differential voltage signals are received in each slave controller by a differential amplifier and the digital signals are received in each slave controller by a digital device.

19. Apparatus for simultaneous bidirectional communication over a line between first and second locations comprising:
    in the first location;
        a first differential amplifier having a positive input coupled to a voltage signal to be coupled to the line;
        an output of the first differential amplifier being coupled to one end of a resistance;
        a second end of the resistance being coupled to the line and to a negative input of the first differential amplifier;
        a second differential amplifier having a differential input coupled across the resistance, and an output responsive to a current in the line; and
    in the second location;
        an amplifier responsive to a voltage on the line; and
        a controllable current source or load coupled to the line and responsive to an input signal to be coupled to the line as a current;
    wherein the apparatus includes a master controller at the first location and a plurality of slave controllers at the second and at least one other location, each having at least one line between the respective slave controller and the master controller;

wherein the master controller includes a pair of multiplexers, whereby voltage signals may be sent by the master controller through one multiplexer to the slave controllers in succession as differential voltage signals while receiving a pair of current signals from the respective slave controllers at the same time through the second multiplexer.

20. The apparatus of claim 19 wherein the apparatus is a power supply controller having a master controller at the first location and a plurality of slave controllers at the second and other locations, each having at least one line between the respective slave controller and the master controller.

21. The apparatus of claim 19 wherein the apparatus is a power supply controller having a master controller at the first location and a plurality of slave controllers at the second and other locations, each having at least two lines between the respective slave controller and the master controller.

22. Apparatus for simultaneous bidirectional communication over a line between first and second locations comprising:
   in the first location;
      a first differential amplifier having a positive input coupled to a voltage signal to be coupled to the line;
      an output of the first differential amplifier being coupled to one end of a resistance;
      a second end of the resistance being coupled to the line and to a negative input of the first differential amplifier;
      a second differential amplifier having a differential input coupled across the resistance, and an output responsive to a current in the line; and
   in each second location;
      an amplifier responsive to a voltage on the line; and
      a controllable current source or load coupled to the line and responsive to an input signal to be coupled to the line as a current;
      a master controller including a pair of multiplexers, whereby voltage signals may be sent by the master controller through one multiplexer to each second location in succession as differential voltage signals while receiving a pair of current signals from the respective second locations at the same time through the second multiplexer.

23. The apparatus of claim 22 wherein the differential voltage signals set the output of the respective power supplies.

24. The apparatus of claim 23 wherein the current signals are responsive to an output current and a temperature of the respective power supply.

25. The apparatus of claim 22 wherein one of the differential voltage signals is coupled to a respective line through a third multiplexer, and wherein digital signals may be coupled to the respective line through the third multiplexer.

26. Apparatus for simultaneous bidirectional communication over a line between first and second locations comprising:
   a power supply controller having a master controller at the first location and a plurality of slave controllers at the second and other locations, each having at least one line between the respective slave controller and the master controller;
   in the first location;
      a first differential amplifier having a positive input coupled to a voltage signal to be coupled to the line;
      an output of the first differential amplifier being coupled to one end of a resistance;
      a second end of the resistance being coupled to the line and to a negative input of the first differential amplifier;
      a second differential amplifier having a differential input coupled across the resistance, and an output responsive to a current in the line; and
   in the second location;
      an amplifier responsive to a voltage on the line; and
      a controllable current source or load coupled to the line and responsive to an input signal to be coupled to the line as a current;
   wherein the master controller includes first and second multiplexers, whereby unique voltage signals may be sent by the master controller through the first multiplexer to the slave controllers in succession while receiving current signals from the respective slave controllers through the second multiplexer at the same time.

27. The apparatus of claim 26 wherein the slave controllers each further comprise a differential amplifier for receiving the differential voltage signal and a digital device for receiving the digital signals.

28. A method of simultaneous bidirectional communication over a line between first and second locations comprising:
   in a power supply controller having a master controller at the first location and a plurality of slave controllers at the second and other locations, each having at least one line between the respective slave controller and the master controller;
   transferring information over the line from the first location to the second location as a voltage signal;
   while simultaneously transferring information over the same line from the second location to the first location as a current signal;
   the master controller including first and second multiplexers, whereby unique voltage signals may be sent by the master controller through the first multiplexer to the slave controllers in succession while receiving current signals from the respective slave controllers through the second multiplexer at the same time.

29. A method of simultaneous bidirectional communication over a first line between first and second locations comprising:
   transferring information over the first line from the first location to the second location as an analog voltage signal;
   while simultaneously transferring information over the same first line from the second location to the first location as an analog current signal;
   the method being practiced in a power supply controller having a master controller at the first location and a plurality of slave controllers at the second and at least one other location, each having at least two lines between the respective slave controller and the master controller; and
   wherein the master controller includes first and second multiplexers, whereby unique voltage signals may be sent by the master controller through the first multiplexer to the slave controllers in succession as differential voltage signals while receiving a pair of current signals from the respective slave controllers at the same time and over the at least two lines through the second multiplexer.

* * * * *